United States Patent Office 3,491,089
Patented Jan. 20, 1970

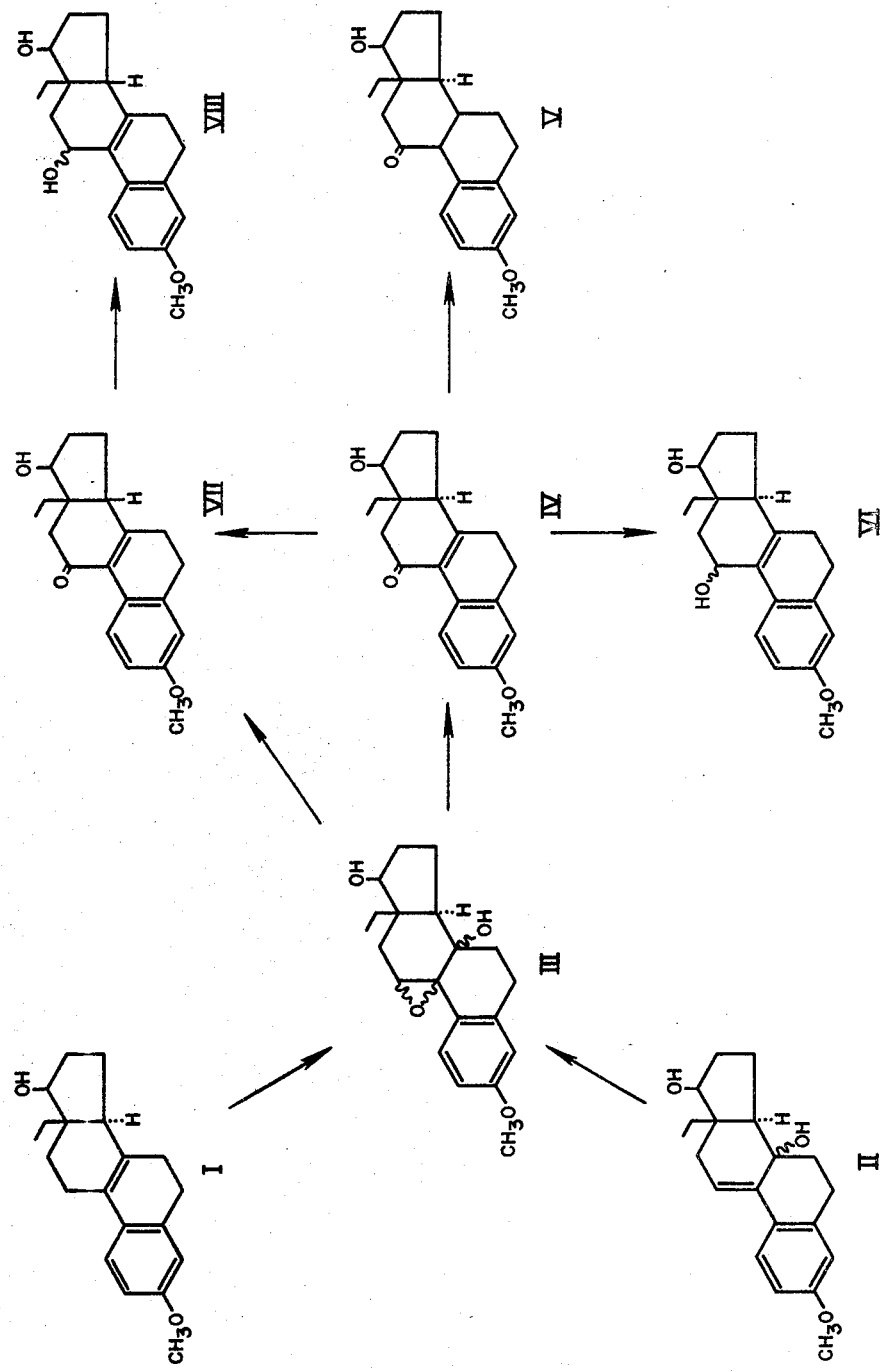

3,491,089
11-OXYGENATED STEROIDS AND PROCESS FOR THEIR PREPARATION
Reinhardt P. Stein, Conshohocken, George C. Buzby, Jr., Philadelphia, Robert C. Smith, Jr., King of Prussia, and Herchel Smith, Wayne, Pa., assignors to American Home Products Corporation, New York, N.Y., a corporation of Delaware
Continuation-in-part of application Ser. No. 585,339, Oct. 10, 1966. This application May 8, 1967, Ser. No. 636,693
Int. Cl. C07d 1/00; C07c 169/02
U.S. Cl. 260—239.55                                23 Claims

ABSTRACT OF THE DISCLOSURE

Treatment of 13-alkylgona-1,3,5(10),8-tetraenes or 13-alkylgona-1,3,5(10),9(11)-tetraen-8-ols with organic peracid results in the formation of corresponding 9,11-epoxy-13-alkylgona-1,3,5(10)-trien - 8 - ols. Treatment of the epoxides with acid at lower temperatures affords gona-1,3,5(10),8-tetraen-11-ones; acid treatment of the epoxides at elevated temperatures gives the corresponding 14β-gona-1,3,5(10),8-tetraen-11-ones. Treatment of gona-1,3,5(10),8-tetraene-11-ones with acid at elevated temperatures or with base results in epimerization to the 14β-form. The 9,11-epoxy and the 11-oxygenated gonanes exert varying hormonal effects in animals, and are intermediates in in the production of other steroids having hormonal activity, particularly the corticosteroids.

CROSS-REFERENCE TO RELATED APPLICATION

This application is a continuation-in-part of application Ser. No. 585,339, filed Oct. 10, 1966, now abandoned.

BACKGROUND OF THE INVENTION

This invention relates to compositions of matter classified in the art of chemistry as 11-oxygenated substituted unsaturated gonane derivatives, to intermediates therefor, and to processes for making and using such compositions. While 11-oxygenated gonanes having varying degrees of unsaturation in the A-ring are known to the art, prior to applicants' invention thereof no 11-oxygenated -13-polycarbonalkyl-gona-1,3,5(10),8-tetraenes or 9,11-epoxy-8-hydroxy-gona-1,3,5(10)-trienes are known to have existed.

SUMMARY OF THE INVENTION

The invention sought to be patented in a principal process aspect resides in the concept of a sequence of reactions including:

(a) converting a 13-alkylgona-1,3,5(10),8-tetraene or a 13-alkylgona-1,3,5(10),9,11-tetraen-8-ol to the corresponding 9,11-epoxy-13-alkylgona-1,3,5(10)-trien-8-ol, (b) Opening the epoxide ring and dehydrating to form a gona-1,3,5(10),8-tetraen-11-one, and (c) Selectively reducing the 8(9)-double bond to form a gona-1,3,5(10)-trien-11-one.

The invention sought to be patented in a second process aspect resides in the concept of converting a 13-alkylgona-1,3,5(10),8-tetraene to the corresponding 9,11-epoxy-13-alkylgona-1,3,5(10)-trien-8-ol.

The invention sought to be patented in a third process aspect resides in the concept of opening the epoxide ring of a 9,11-epoxy-13-alkylgona-1,3,5(10)-trien-8-ol and dehydrating to form a 13-alkylgona-1,3,5(10),8-tetraen-11-one.

The invention sought to be patented in a fourth process aspect resides in the concept of opening the epoxide ring of a 9,11-epoxy-13-alkylgona-1,3,5(10)-trien-8-ol and dehyrating, at an elevated temperature, to form a 13-alkyl-14β-gona-1,3,5(10),8-tetraen-11-one.

The invention sought to be patented in a fifth process aspect resides in the concept of epimerizing a 13-alkyl-gona-1,3,5(10),8-tetraen-11-one by treatment with acid or base to afford the corresponding 13-alkyl-14β-gona-1,3,5(10),8-tetraen-11-one.

The invention sought to be patented in a sixth process aspect resides in the concept of selectively reducing the 8(9)-double bond of a 13-alkylgona-1,3,5(10),8-tetraen-11-one to form a 13-alkylgona-1,3,5(10)-trien-11-one.

The invention sought to be patented in a principal composition aspect of the invention resides in the concept of a 13-alkyl-9,11-epoxygona-1,3,5(10)-trien-8-ol.

The tangible embodiments of the principal composition aspect of the invention possess the inherent general physical properties of being white crystalline solids, are substantially insoluble in water, and are generally soluble in such organic solvents as benzene, ethyl acetate, ethyl ether, and methanol. Examination of the compounds produced according to the hereinafter described process reveals, upon infrared, ultraviolet and nuclear magnetic resonance spectrographic analysis, spectral data supporting the molecular structure hereinbefore set forth. For example, the epoxide of the substituted styrene type is evident in the ultraviolet spectrum. The aforementioned physical characteristics, taken together with the nature of the starting materials and the elemental analysis of the products obtained therefrom, further confirm the molecular structure hereinbefore set forth.

The tangible embodiments of the principal composition aspect of the invention possess the applied use characteristic of being intermediates for making compositions which possess the inherent applied use characteristic of exerting qualitatively varying hormonal effects in animals as evidenced by pharmacological evaluation according to standard test procedures, particularly compounds having androgenic, anabolic, and antiinflammatory effects. Furthermore, the tangible embodiments of the principal composition aspect of the invention possess the inherent applied use characteristic of exerting qualitatively varying hormonal effects in animals as evidenced by pharmacological evaluation according to standard test procedures, specifically estrogenic and hypolipemic effects.

The invention sought to be patented in a second composition aspect of the invention resides in the concept of an 11-oxygenated-13-polycarbon-alkylgona-1,3,5(10),8-tetraene.

The tangible embodiments of the second composition aspect of the invention possess the inherent physical properties of being generally white crystalline solids, are substantially insoluble in water, and are generally soluble in such organic solvents as benzene, ethyl acetate, ethyl ether, and methanol. Examination of the compounds produced according to the hereinafter described process reveals, upon infrared, ultraviolet, and nuclear magnetic resonance spectrographic analysis, spectral data supporting the molecular structure hereinbefore set forth. For example, the 11-oxygenated function is evident in the infrared, while the conjugate unsaturation is evident in the ultraviolet. The aforementioned physical characteristics taken together with the nature of the starting materials and the elemental analysis of the products obtained therefrom further confirm the molecular structure hereinbefore set forth.

The tangible embodiments of the second composition aspect of the invention possess the applied use characteristic of being intermediates for making compositions which possess the inherent applied use characteristic of exerting qualitatively varying hormonal effects in animals as evidenced by pharmacological evaluation accord ing to standard test procedures, particularly compounds having androgenic, anabolic and anti-inflamamtory effects. Furthermore, the tangible embodiments of the second composition aspect of the invention possess the inherent applied use characteristic of exerting qualitatively varying hormonal effects in animals as evidenced by pharmacological evaluation according to standard test procedures, specifically estrogenic and hypolipemic effects.

The invention sought to be patented in a third composition aspect of the invention resides in the concept of an 11-oxygenated-13-alkyl-14β-gona-1,3,5(10),8-tetraene.

The tangible embodiments of the third composition aspect of the invention possess the inherent physical properties of being generally white crystalline solids, are substantially insoluble in water, and are generally soluble in such organic solvents as benzene, ethyl acetate, ethyl ether, and methanol. Examination of the compounds produced according to the hereinafter described process reveals, upon infrared, ultraviolet, and nuclear magnetic resonance spectographic analysis, spectral data supporting the molecular structure hereinbefore set forth. For example, the 11-oxygenated function is evident in the infrared, while the conjugate unsaturation is evident in the ultraviolet. The aforementioned physical characteristics taken together with the nature of the starting materials and the elemental analysis of the products obtained therefrom further confirm the molecular structure hereinbefore set forth.

The tangible embodiments of the third composition aspect of the invention possess the applied use characteristic of being intermediates for making compositions which possess the inherent applied use characteristic of exerting qualitatively varying hormonal effects in animals as evidenced by pharmacological evaluation according to standard test procedures. Furthermore, the tangible embodiments of the third composition aspect of the invention possess the inherent applied use characteristic of exerting hormonal effects in animals as evidenced by pharmacological evaluation according to standard test procedures, particularly hypolipemic effects.

BRIEF DESCRIPTION OF THE DRAWING

In describing the invention, reference will be made to the annexed drawing wherein is illustrated schematically the reaction sequence for preparing a 13-alkylgona-1,3,5(10)-trien-11-one, specifically 13-ethyl-17-hydroxy-3-methoxygona-1,3,5(10)-trien-11-one; a 13-alkylgona-1,3,5(10),8-tetraen-11-ol, specifically 13-ethyl-3-methoxygona-1,3,5(10),8-tetraene-11,17-diol; a 13-alkyl-14β-gona-1,3,5(10),8-tetraen-11-one, specifically 13-ethyl-17-hydroxy-3-methoxy-14β-gona-1,3,5(10),8-tetraen-11-one; and a 13-alkyl-14β-gona-1,3,5(10),8-tetraen-11-ol, specifically 13-ethyl-3-methoxy-14β-gona-1,3,5(10),8-tetraen-11,17-diol.

DESCRIPTION OF THE PREFERRED EMBODIMENTS

Referring now to the figure wherein the compounds are assigned Roman numerals for identification, the starting materials for the process of the invention, i.e., the 13-alkylgona-1,3,5(10),8-tetraenes (I) or the 13-alkylgona-1,3,5(10),9(11)-tetraen-8-ols (II) are prepared as described in British Patents Ser. No. 991,594 and Ser. No. 1,024,911 (I), and U.S. application Ser. No. 559,175, filed June 21, 1966 (II), or from compounds whose preparation from the compounds described in the cited specifications would be obvious to one skilled in the art of organic chemistry. If the starting material selected is a 13-alkylgona-1,3,5(10),8-tetraene (I), it is treated with at least two molar equivalents of an organic peracid, such as, for example, m-chloroperbenzoic acid, in a solvent of moderate polarity, such as benzene, chloroform or methylene chloride, preferably at about room temperature or above, to prepare the corresponding 9,11-epoxy-13-alkylgona-1, 3,5(10)-trien-8-ol (III). If the selected starting material is a 13-alkylgona-1,3,5(10),9(11)-tetraen-8-ols, it is treated with at least one molar equivalent of peracid under similar conditions to give III. Treating the 9,11-epoxide under acidic conditions, preferably with hydrochloric acid in methanol, preferably at room temperature or below, gives by rearrangement and dehydration the corresponding 13-alkylgona-1,3,5(10),8-tetraen-11-one (IV). This latter compound is then reduced under selective conditions, preferably with alkali metal in liquid ammonia, to afford the corresponding 13-alkylgona-1,3,5(10)-trien-11-one (V). Treating the 9,11-epoxide under acidic conditions, preferably with hydrochloric acid in methanol, at elevated temperature, preferably at the boiling point, gives by rearrangement, dehydration and epimerization the corresponding 13-alkyl-14β-gona-1,3,5(10),8-tetraen-11-one (VII). Alternatively, if the 14β-epimer is the desired product, it may be obtained from the 13-alkylgona-1,3,5(10),8-tetraen-11-one (IV) by treatment with base, preferably sodium or potassium hydroxide in methanol, or by treatment at elevated temperatures with acid, preferably hydrochloric acid in methanol. The tetraen-11-ones (IV and VII) may be reacted in known manner with a metal hydride to form the corresponding 11-ols (VI and VIII).

It is to be noted that treatment of the epoxide (III) with acid will give a tetraen-11-one having the 14-hydrogen atom either in the α or β configuration. At room temperature or below, and using hydrochloric acid, product having the 14-hydrogen atom in the α-configuration is formed almost exclusively. The lowest practical temperature usable is determined by the solubility of the specific epoxide starting material in the solvent being employed. Treatment of the epoxide at or near the boiling point of methanol gives rise almost exclusively to a tetraen-11-one having the 14-hydrogen atom in the β-configuration. At temperatures between room temperature and boiling, a mixture of the two epimers is formed, the proportion of said mixture having the 14β-hydrogen increasing as the temperature is increased.

Alcohols other than methanol and acids other than hydrochloric acid can be used for the epoxide acid treatment step. It will be apparent to one skilled in the art of steroid chemistry that the epimerization from 14α- to 14β- is a function of both acid strength and temperature, and that, e.g., if an acid of greater strength then hydrochloric acid is used then the formation of the 14β-epimer will proceed at a lower temperature. It is thus apparent that the particular temperature conditions to produce a desired epimeric form can be readily calculated from consideration of the acid strength of the acid being used relative to the strength of hydrochloric acid. Such process variations in acid and temperature are the full equivalents of this process as particularly described.

While the processes have been specifically described by reference to the drawing which illustrates the application of the processes of our invention to compounds having a methoxy group in the 3-position, it will be apparent to those skilled in the art of organic chemistry that the processes are also applicable where other groups are present in that position. Thus, in the practice of the second process aspect of the invention, namely the conversion of a 1,3,5(10),8-tetraen or a 1,3,5(10),9(11)-tetraen-8-ol to a 9,11-epoxy-1,3,5(10)-trien-8-ol, any group may be present at the 3-position so long as it is unaffected by the process of the reaction, or if affected, will give a desired reaction product. For the practice of the third process aspect of the invention, namely the opening of the 9,11-epoxy function, there is the limitation that the substituent at the 3-position should not be ring-deactivating in electrophilic aromatic substitution. Thus, for example, the 3-position may contain such functions as alkoxy, hydroxy, hydrogen, or acyloxy, but not, e.g., trimethylammonium, nitro, etc.

Similarly, while the processes have been specifically described by reference to the drawing which illustrates the application of the process of our invention to a compound having a 17-hydroxy group, it will be apparent to those skilled in the art of organic chemistry that other groups may be substituted in that position. Thus, in lieu of an hydroxy group, the 17-carbon may bear any substituent which is unaffected by the reactions of the invention, or, if affected, will give a desired reaction product. Thus, for example, in lieu of an hydroxy group the 17-position may bear such substituents as a keto group, an acyloxy group, an hydroxy and an ethynyl group, or a ketal group. Furthermore, where a 17-carbonyl is present in any of the intermediate or product aspects of the invention, it may be converted to an, e.g., alkyl hydroxymethylene, alkynyl hydroxymethylene, or hydroxymethylene group, and may be ketalized or thioketalized, all by methods known to those skilled in the art. It will be readily apparent that 17-carbonyl will be simultaneously reduced upon borohydride reduction of the 11-carbonyl in the production of the 11-hydroxy-1,3,5(10),8-tetraene compounds of this invention. If a 17-carbonyl product is desired, it will therefore be necessary to protect this position by one of the known methods.

The hereinbefore described processes give rise to compounds which, in addition to their previously described inherent hormonal activity, are intermediates for synthetic routes to other steroids having hormonal activity, particularly the important class of corticosteroids. Thus, for example, by known methods 3-methoxy-13-methylgona-1,3,5(10)-trien-17-dione may be converted to cortisone. The compounds produced by the processes of this invention are also useful as intermediates in the production of other compounds having hormonal activity, such as 11-hydroxy-testosterone and 11-hydroxy-estrone.

The processes (and the compounds produced by them) provide a novel, unique and feasible route to compounds difficult or impossible to obtain from natural steroids, namely, where the group in the 13-position is polycarbon alkyl. The 13-polycarbonalkyl group can be of varying chain length, such as, for example, ethyl, propyl, isopropyl, butyl, isobutyl, pentyl, etc., and even cetyl, and for the processes of the invention when such groups are present in the starting material they will correspondingly be present in the intermediates and the final product, and as intermediates and in the processes of the invention, are the full equivalents of the compounds particularly described and claimed.

It will be apparent to those skilled in the art of chemistry that the starting compound can bear substituents at positions of the steroid nucleus other than those previously mentioned. Thus, for example, the nucleus may bear such substituents as 6- or 7-methyl or ethyl, or 16-hydroxy. Such variations in the composition and processes of this invention are the full equivalents of the compositions and processes as particularly described.

It will also be apparent to those skilled in the art that where in the composition aspect of the invention there is a hydroxy group present this group can be esterified with a carboxylic acid, such as for example, acetic, propionic, butyric, decanoic, benzoic, etc. ether directly or by means of derivatives such as their anhydrides or halides, to form esters and such esters are full equivalents of the compounds of the corresponding intermediates and products in their applied use characteristic of exerting qualitatively varying hormonal effects differing in degree of activity rather than kind. Similarly the corresponding inorganic acid esters such as, for example, the 17-sulfate and the 17-phosphate can be prepared and are the full equivalents of the composition aspect of the invention in the applied use characteristic of exerting hormonal effects.

While the tetracyclic compounds in the specification and the appended examples are usually named to describe the configuration corresponding to that of the natural steroid, it is to be understood that the configuration is unaffected by the processes of the reaction, so that if the starting material is a racemic mixture, the product will be a racemic mixture, and if the starting material is a particular enantiomorphic configuration, then the product will be of the same enantiomorphic series.

Wherever used in this application, the term "oxygenated" denotes the presence of an oxo or hydroxy group, or an oxygen-containing group readily convertible thereto; for example an acyloxy or a ketal group.

The following examples illustrate the best mode contemplated by the inventors of carrying out the processes of the invention, and the manner of using as intermediates the compositions of the invention.

EXAMPLE 1

($\pm$)-9,11-epoxy-8-hydroxy-3-methoxy-13-methylgona-1,3,5(10)-trien-17-one

Dissolve ($\pm$)-3-methoxy-13-methylgona - 1,3,5(10),8-tetraen-17-one (5.00 g.) in chloroform (200 ml.) and add m-chloroperbenzoic acid (7.63 g.) to the solution (slight warming). Stir the reaction at room temperature for 3 hours. Remove the chloroform in vacuo. Dissolve the residue in ethyl acetate and wash the extract well with 5% potassium hydroxide solution with water and with saturated sodium chloride solution, then dry the extract over anhydrous sodium sulfate. Filter and remove the solvent in vacuo. Dissolve the resulting oil in benzene and stand to let crystallize. Filter the white crystalline solid to get the title product (2.17 g.); M.P. 164–166° and second crops (1.27 g.); M.P. 153–158°. Purify the first crop material by dissolving in methylene chloride, treating with Nuchar charcoal and filtering through Super Cel. Replace the methylene chloride with ethyl acetate by boiling in the steam bath, then allow to cool and crystallize. Filter the resulting white needles of solvated title product (1.84 g.); M.P. 153–155°;

$\lambda_{max.}^{KBr}$ 2.95 and 5.80$\mu$ ($\epsilon$ 11,200)

The analytical sample (from ether) has M.P. 156–160°. Calcd. for $C_{19}H_{22}O_4$: C, 72.59; H, 7.05%. Found: C, 72.37; H, 6.95% and $\lambda_{max.}^{EtOH}$ 235 m$\mu$ ($\epsilon$ 12,800)

EXAMPLE 2

($\pm$)-9,11-epoxy-8-hydroxy-3-methoxy-13-methylgona-1,3,5(10)-trien-17-one

Dissolve ($\pm$)-3-methoxy-13-methylgona - 1,3,5(10),8-tetraen-17-one (50.0 g.) in benzene (600 ml.). To the stirring solution add m-chloroperbenzoic acid (75.0 g.) in small portions over a period of 2 hours. During the period of addition, use an ice-bath to maintain a reaction temperature at 20–40° C. After complete addition of the reagent add ethyl acetate (300 ml.) and continue stirring at room temperature for 3 hours. Quench the reaction by the addition of 5% potassium carbonate solution (1 liter). Separate the layers, wash the extract with 5% sodium hydroxide solution, water and with saturated sodium chloride solution then dry over anhydrous sodium sulfate. Filter and evaporate the solvent in vacuo. Dissolve the resulting oil in ether, scratch to induce crystallization then let stand to complete crystallization. Filter the white crystalline solid to get 15.5 g. of title product; M.P. 161–164°;

$\lambda_{max.}^{KBr}$ 297 and 5.75$\mu$; $\lambda_{max.}^{EtOH}$ 235 m$\mu$ ($\epsilon$ 12,800)

Calcd. for $C_{19}H_{22}O_4$: C, 72.59; H, 7.05. Found: C, 72.37; H, 6.95.

EXAMPLE 3

($\pm$)-9,11-epoxy-8-hydroxy-3-methoxy-13-methylgona-1,3,5(10)-trien-17-one

Stir ($\pm$)-8-hydroxy - 3 - methoxy - 13 - methylgona-1,3,5(10),9(11)-tetraen-17-one (1.25 g.) in benzene (50 ml.) and add m-chloroperbenzoic acid (0.95 g.) to the mixture. Stir at room temperature for 2 hours. Dilute the reaction with ethyl acetate and wash the extract well with 5% sodium hydroxide solution, then dry over anhydrous sodium sulfate. Filter and remove the solvents in vacuo. Dissolve the oil in warm ether, then stand to let crystallize. Filter the white needles to obtain the title product (0.92 g.); M.P. 149–155°;

$\lambda_{max.}^{KBr}$ 2.95 and 5.75$\mu$; $\lambda_{max.}^{EtOH}$ 232 m$\mu$ ($\epsilon$ 11,800)

EXAMPLE 4

($\pm$)-9,11-epoxy-3-methoxy-13-methylgona-1,3,5(10)-trien-8,17$\beta$-diol

Mix ($\pm$)-9,11-epoxy - 8 - hydroxy - 3 - methoxy - 13-methylgona-1,3,5(10)-trien-17-one (2.00 g.) and methanol (100 ml.), then add sodium borohydride (a total of 2.0 g.) in small portions to the stirred mixture over a period of 1 hour. After complete addition, stir for 1.5 hours more at room temperature. Add water (400 ml.), then extract the mixture with ethyl acetate. Wash the extract with water and saturated sodium chloride solution, then dry over anhydrous sodium sulfate. Filter and remove the solvent in vacuo. Dissolve the yellow oil in methylene chloride, treat with Nuchar charcoal and filter through Super Cel. Remove the methylene chloride in vacuo, triturate the oil with ether and let stand to crystallize. Filter to get 1.34 g. of the title product as a white crystalline solid; M.P. 176–178°;

$\lambda_{max.}^{KBr}$ 3.02$\mu$; $\lambda_{max.}^{EtOH}$ 235 m$\mu$ ($\epsilon$ 12,900)

EXAMPLE 5

($\pm$)-9,11-epoxy-3-methoxy-13-methylgona-1,3,5(10)-triene-8,17$\beta$-diol

Dissolve ($\pm$)-3-methoxy-13-methylgona - 1,3,5(10),8-tetraen-17$\beta$-ol (50 g.) in benzene (500 ml.) and tetrahydrofuran (100 ml.) and carefully add this dropwise to a stirred mixture of m-chloroperbenzoic acid (75 g.) and benzene (400 ml.) over a period of two hours. (Use an ice bath to maintain the temperature at 25–30° C.) After complete addition, continue stirring the reaction at room temperature for 3 hours. Quench the reaction by adding 5% potassium carbonate solution (1 liter), then stir at room temperature a few more minutes. Separate the layers, dilute the extract with ethyl acetate and wash the extract with 5% sodium hydroxide solution, with water and with saturated sodium chloride solution, then dry the solution over anhydrous sodium sulfate. Filter and remove the solvents in vacuo. The resulting yellow oil contains the title product ($\lambda_{max.}^{EtOH}$ 232 m$\mu$)

EXAMPLE 6

($\pm$)-9,11-epoxy-3-methoxy-13-methylgona-1,3,5(10)-triene-8,17$\beta$-diol

Dissolve ($\pm$) - 3 - methoxy - 13 - methylgona-1,3,5(10),9(11)-tetraene - 8,17$\beta$ - diol (48.0 g.) in tetrahydrofuran (700 ml.) and add this solution dropwise to a stirred mixture of m-chloroperbenzoic acid (35.5 g.) and benzene (300 ml.), using an ice-bath to maintain a reaction temperature of 15–20°. After complete addition remove the ice-bath and continue stirring at room temperature for 1.5 hours. Dilute the reaction mixture with ethyl acetate, wash with aqueous sodium carbonate solution, with water and with saturated sodium chloride solution. Dry the extract, filter and evaporate the solvents in vacuo to give 53.6 g. of the title product as a clear yellow oil which is suitably pure for further treatment with acid.

EXAMPLE 7

($\pm$)-9,11-epoxy-8-hydroxy-3-methoxy-13-ethylgona-1,3,5(10)-trien-17-one

Dissolve ($\pm$)-3-methoxy-13 - ethylgona - 1,3,5(10),8-tetraen-17-one (5.00 g.) in chloroform (150 ml.), then add m-chloroperbenzoic acid (6.76 g.) carefully to the stirred solution. (Warming is evident as the peracid is being added.) Continue stirring the reaction at room temperature for 2 hours. Remove the solvent in vacuo and triturate the solid with ether and filter to give the title product (1.76 g.) as a white crystalline solid; M.P. 160–165°. Allow the filtrate from above to stand to deposit a further 1.43 g. of title product; M.P. 138–145°. Dilute the latter filtrate with ether and wash the extract well with 5% sodium hydroxide solution, with water and with saturated sodium chloride solution and dry over anhydrous sodium sulfate. Filter and remove the solvent in vacuo. Cover the residue with ether and let stand to fully crystallize. Filter the white crystalline solid to obtain a further 2.19 g. of title product; M.P. 145–150°. Combine the above three crops and dissolve them in methylene chloride. Treat the solution with Nuchar charcoal, warm, then let cool and filter the mixture through Super Cel. Replace the methylene chloride with ethyl acetate by boiling on the steam bath and let cool to crystallize. Filter the white crystalline solid to give 2.55 g. of the pure title product; M.P. 192–196°;

$\lambda_{max.}^{KBr}$ 2.88 and 5.77$\mu$; $\lambda_{max.}^{EtOH}$ 234 m$\mu$ ($\epsilon$ 12,600)

Calcd. for $C_{20}H_{24}O_4$: C, 73.14; H, 7.37. Found: C, 72.84; H, 7.17.

EXAMPLE 8

($\pm$)-9,11-epoxy-8-hydroxy-3-methoxy-13-ethylgona 1,3,5(10)-trien-17-one

Dissolve ($\pm$)-8-hydroxy-3-methoxy-13-ethylgona-1,3,5 (10),9(11)-tetraen-17-one (1.3 g.) and m-chloroperbenzoic acid (0.91 g.) in benzene (100 ml.) and stir at room temperature for 19 hours. Dilute the solution with benzene (300 ml.) and wash the extract with 10% sodium hydroxide solution, with water and with saturated sodium chloride solution, then filter and remove the solvent in vacuo to give an oil. Dissolve the oil in ethyl acetate and let crystallize. Filter the white crystalline solid to give 0.64 g. of the title product; M.P. 188–200°;

$\lambda_{max.}^{KBr}$ 2.92 and 5.79$\mu$

EXAMPLE 9

($\pm$)-9,11-epoxy-3-methoxy-13-ethylgona-1,3,5(10)-triene-8,17$\beta$-diol

Stir ($\pm$)-9,11-epoxy-8-hydroxy-3-methoxy - 13 - ethylgona- 1,3,5(10)-trien-17-one (0.50 g.) with methanol (20 ml.) and add sodium borohydride (total of 0.75 g.) portionwise to the stirred mixture over a period of 1 hour. After complete addition, stir the reaction for 1 hour more, then dilute the solution with water. Extract the mixture with ether and wash the extract with water and with saturated sodium chloride solution, then dry over anhydrous sodium sulfate. Filter and remove the ether in vacuo to get a clear oil. Triturate the oil with petroleum ether to give the title product (0.27 g.) as a white solid; M.P. 151–154°;

$\lambda_{max.}^{KBr}$ 2.97$\mu$ (broad OH); $\lambda_{max.}^{EtOH}$ 234 m$\mu$ ($\epsilon$ 12,500)

Calcd. for $C_{20}H_{26}O_4$: C, 72.70; H, 7.93. Found: C, 72.78; H, 7.72.

EXAMPLE 10

($\pm$)-9,11-epoxy-3-methoxy-13-ethylgona-1,3,5(10)-triene-8,17$\beta$-diol

Dissolve ($\pm$)-3-methoxy-13 - ethylgona - 1,3,5,(10),9 (11)-tetraene-8,17$\beta$-diol (35.0 g.) in tetrahydrofuran (400 ml.) and add the solution dropwise to a stirred mixture of m-chloroperbenzoic acid (24.8 g.) and benzene (400 ml.) using an ice-bath to maintain a reaction temperature of 15–20°. After complete addition stir the reaction at room temperature for 2.5 hours. Dilute with ethyl acetate, wash the extract with aqueous sodium bicarbonate solution, water, and saturated sodium chloride solution. Dry the extract over sodium sulfate, filter and evaporate the solvents in vacuo to give 39.5 g. of the title compound as yellow oil of suitable purity for further reaction.

EXAMPLE 11
(±)-9,11-epoxy-3-methoxy-13-ethylgona-1,3,5(10)-triene-8,17β-diol

Dissolve (±)-3-methoxy-13 - ethylgona - 1,3,5(10),8-tetraen-17β-ol (10.00 g.) in benzene (200 ml.) and carefully add m-chloroperbenzoic acid (16.0 g.) in small portions to the stirred solution (strong warming is evident upon addition of the peracid). Stir the reaction for 2 hours at room temperature. Add ether (100 ml.) to dissolve the precipitated m-chloroperbenzoic acid, then continue stirring for 2 hours more. Quench the reaction by the addition of 5% potassium carbonate solution (300 ml.), separate the layers and dilute the organic layer with ethyl acetate. Wash the extract with 5% sodium hydroxide solution, water and saturated sodium chloride solution, then dry over anhydrous sodium sulfate. Filter and remove the solvents in vacuo to give an orange oil containing the title product. The product is not further purified but further treated with hydrochloric acid as described in Example 12.

EXAMPLE 12
(±)-17β-hydroxy-3-methoxy-13-ethylgona-1,3,5(10),8-tetraen-11-one

Dissolve the oil from Example 11 in methanol (100 ml.) and add to it 18% hydrochloric acid (10 ml.). Stir the solution at room temperature for 2 hours. Filter the solid to obtain the title product.

EXAMPLE 13
(±)-17β-hydroxy-3-methoxy-13-methylgona-1,3,5(10),8-tetraen-11-one Add a solution of (±)-3-methoxy-13-methylgona-1,3,5-(10),9(11)-tetraene-8,17β-diol (50.0 g.) in tetrahydrofuran (500 ml.) dropwise to a stirred mixture of m-chloroperbenzoic acid (37.1 g.) and benzene (250 ml.). (Use an ice-bath to keep the temperature of the solution below 25° C.) After complete addition, stir the reaction at room temperature for 1.5 hours. Then dilute the reaction mixture with ethyl acetate. Wash the extract with 10% sodium carbonate solution, water and saturated sodium chloride solution, then dry over anhydrous sodium sulfate. Filter and remove the solvent in vacuo to an oil which contains (±)-9,11-epoxy-3-methoxy-13-methyl-gona-1,3,5(10)-triene-8,17β-diol. Dissolve the oil in methanol (250 ml.), then add 4 N hydrochloric acid (100 ml.) and stir at room temperature for a few minutes. Filter the mixture to obtain 35.5 g. of the title product; M.P. 198–201°;

$\lambda_{max.}^{KBr}$ 3.0 and 6.13μ; $\lambda_{max.}^{EtOH}$ 246 mμ (ε 16,470)

EXAMPLE 14
(±)-17β-hydroxy-3-methoxy-13-methylgona-1,3,5(10),8-tetraen-11-one Dissolve the oil from Example 5 in methanol (200 ml.) boiling the mixture to fully dissolve the oil. Remove the heat and add 18% hydrochloric acid (10 ml.) to the solution. Stir the reaction at room temperature, then cool with an ice-bath. Dilute the reaction with water (250 ml.) and ethyl acetate, and filter the mixture to obtain 8.7 g. of the title product; M.P. 200–204°. Further purify a sample (1.00 g.) by treating a boiling tetrahydrofuran solution with Nuchar charcoal, then filter the hot mixture through Super Cel. Replace the solvent with ethanol by boiling in the steam bath and allow the solution to stand to deposit 0.78 g. of pure title product as tiny prisms; M.P. 210–213°;

$\lambda_{max.}^{KBr}$ 2.98 and 6.13μ; $\lambda_{max.}^{EtOH}$ 247 mμ (ε 17,300)

Calcd. for $C_{19}H_{22}O_3$: C, 76.48; H, 7.43%. Found: C, 76.64; H, 7.38%.

EXAMPLE 15
(±)-17β-hydroxy-3-methoxy-13-ethylgona-1,3,5(10),8-tetraen-11-one

Add a solution of (±)-3-methoxy-13-ethylgona-1,3,5-(10),9(11)-tetraene-8,17β-diol (35.0 g.) in tetrahydrofuran (400 ml.) dropwise to a stirred mixture of m-chloroperbenzoic acid (24.8 g.) and benzene (400 ml.). (Use an ice-bath to keep the temperature of the reaction at 15–20°.) After complete addition, stir the reaction at room temperature for 2.5 hours. Dilute the mixture with ethyl acetate and wash the extract with 10% sodium bicarbonate solution, with water and with saturated sodium chloride solution, then dry over anhydrous sodium sulfate. Filter and remove the solvents in vacuo to an oil (39.5 g.) which contains (±)-9,11-epoxy-3-methoxy-13-ethylgona-1,3,5(10)-triene-8,17β-diol ($\lambda_{max.}^{EtOH}$ 235 mμ)

Dissolve the oil in methanol (150 ml.) and at room temperature add 3 N hydrochloric acid (75 ml.) to the solution. Stir at room temperature a few minutes, then filter to obtain 25.1 g. of the title product; M.P. 179–185°. Recrystallize a sample from ethyl acetate-acetone to obtain the pure title product; M.P. 184–190°;

$\lambda_{max.}^{KBr}$ 2.97 and 6.13μ; $\lambda_{max.}^{EtOH}$ 247 mμ (ε 17,000)

EXAMPLE 16
(±)-13-methyl-17β-hydroxy-3-methoxygona-1,3,5(10)-trien-11-one

Add (±) - 13 - methyl - 17β-hydroxy-3-methoxygona-1,3,5(10),8-tetraen-11-one (5.0 g.) in dry tetrahydrofuran (200 ml.) dropwise to liquid ammonia (800 ml.) containing tetrahydrofuran (100 ml.) and lithium (0.80 g.). After addition is complete, stir the reaction until the blue color discharges. Add water and extract the suspension with ether. Wash the ether layer with water until the aqueous washings are neutral, dry the solution and remove the solvent. Recrystallize the crystalline residue from ether to provide the title compound (1.87 g.); M.P. 174–179° C.;

$\lambda_{max.}^{KBr}$ 2.85, 5.86μ

Calcd. for $C_{19}H_{24}O_3$: C, 75.97; H, 8.05. Found: C, 75.58; H, 7.70.

EXAMPLE 17
(±)-13-methyl-3-methoxy-gona-1,3,5(10)-triene-11,17β-diol

Treat (±)-13-methyl- 17β - hydroxy-3-methoxy-gona-1,3,5(10)-trien-11-one (100 mg.) in methanol (20 ml.) with sodium borohydride (100 mg.). After reflux ceases, add a second portion of sodium borohydride (100 mg.). At the termination of the reaction, add water dropwise with stirring and filter and dry the solid product to provide the title compound (100 mg.); M.P. 168–173°.

$\lambda_{max.}^{KBr}$ 2.96, 8.13μ

Calcd. for $C_{19}H_{26}O_3$: C, 75.46; H, 8.69. Found: C, 75.25; H, 8.84.

EXAMPLE 18
(±)-13-ethyl-17β-hydroxy-3-methoxy-gona-1,3,5(10)-trien-11-one

Add (±)-13-ethyl-17β-hydroxy-3-methoxy-gona-1,3,5-(10),8-tetraen-11-one (1.5 g.) in dioxane-ether (1 to 1) (60 ml.) dropwise to lithium metal (0.26 g.) in liquid ammonia (200 ml.). Stir the solution until the blue color is discharged and add saturated aqueous ammonium chloride. Extract the reaction with ether, wash the ether layer until the washings are neutral and evaporate the solvent to provide the title compound.

EXAMPLE 19

(±)-13-ethyl-3-methoxy-gona-1,3,5,(10)-trien-11,17β-diol

Treat (±)-13-ethyl-17β-hydroxy-3-methoxy-gona-1,3,5(10)-trien-11-one (1.35 g.) in methanol (65 ml.) with sodium borohydride (1.5 g.). After spontaneous reflux ceases, pour the reaction into water, extract with ether and wash, dry and evaporate the ether layer to provide the title compound.

EXAMPLE 20

(±)-13-methyl-3-methoxygona-1,3,5(10),8-tetraene-11,17-dione

Dissolve (±)-9,11-epoxy-8-hydroxy-3-methoxy-13-methylgona-1,3,5(10)-trien-17-one (1.00 g.) in tetrahydrofuran (15 ml.) then dilute with methanol (35 ml.). Add 18% hydrochloric acid (2 ml.) and stir at room temperature for 45 minutes. Dilute with water (150 ml.) and filter the resulting crystalline precipitate. Dissolve the solid in methylene chloride, treat with Nuchar charcoal and filter through Super Cel. Replace the solvent with ethanol by boiling on the steam bath, then let cool to fully crystallize. Filter to give 0.30 g. of the title product; M.P. 150–154°;

$\lambda_{max.}^{KBr}$ 5.75 and 6.04µ; $\lambda_{max.}^{EtOH}$ 247 mµ (ε 16,600)

EXAMPLE 21

(±)-13-methyl-3-methoxygona-1,3,5(10),8-tetraene-11,17-dione

Dissolve (±)-9,11-epoxy-8-hydroxy-3-methoxy-13-ethylgona-1,3,5(10)-trien-17-one (2.00 g.) in tetrahydrofuran (25 ml.), then dilute with methanol (50 ml.). Add 18% hydrochloric acid (5 ml.) and stir at room temperature for one hour. Dilute with water (250 ml.), filter and dry to obtain the title product.

EXAMPLE 22

(±)-3-methoxy-13-methyl-14β-gona-1,3,5(10),8-tetraene-11,17-dione

Dissolve (±)-9,11-epoxy-8-hydroxy-3-methoxy-13-methylgona-1,3,5(10)-trien-17-one (1.00 g.) in a portion of methanol-methylene chloride (3:1) then boil until most of the methylene chloride is removed. Add 18% hydrochloric acid (10 ml.) to the solution and continue boiling for 15 minutes. Allow the reaction to cool and scratch the flask to induce crystallization. Filter to obtain the title product (0.38 g.) as slightly blue needles; M.P. 180–182°;

$\lambda_{max.}^{KBr}$ 5.75, 6.03 and 6.20µ; $\lambda_{max.}^{EtOH}$ 245 mµ (ε 16,800)

Calcd. for $C_{19}H_{20}O_3$: C, 77.00; H, 6.80. Found: C, 77.00; H, 7.16.

EXAMPLE 23

(±)-3-methoxy-13-methyl-14β-gona-1,3,5(10),8-tetraene-11,17-dione

Dissolve (±)-3-methoxy-13-methylgona-1,3,5(10),8-tetraene-11,17-dione (1.00 g.) in boiling methanol (50 ml.) then add concentrated hydrochloric acid (1 ml.) and continue boiling for 10 minutes. Let the reaction stand at room temperature to cool and crystallize. Filter the slightly blue fuzzy precipitate to obtain 0.87 g. of the title product, M.P. 177–179°.

EXAMPLE 24

(±)-17β-hydroxy-3-methoxy-13-methyl-14β-gona-1,3,5(10),8-tetraen-11-one

Dissolve (±)-9,11-epoxy-3-methoxy-13-methylgona-1,3,5(10)-triene-8,17β-diol (2.00 g.) in boiling methanol (75 ml.) and add 18% hydrochloric acid (5 ml.) to the solution. Continue boiling for 20 minutes, dilute with water and let cool to deposit the title compound.

EXAMPLE 25

(±)-17β-hydroxy-3-methoxy-13-methyl-14β-gona-1,3,5(10),8-tetraen-11-one

Dissolve (±)-17β-hydroxy-3-methoxy-13-methylgona-1,3,5(10),8-tetraen-11-one (1.00 g.) by boiling in methanol (60 ml.) then add 18% hydrochloric acid (35 ml.) dropwise to the hot solution. Continue heating on the steam bath for 20 minutes then cool to room temperature. Dilute with water (250 ml.) and extract with ether. Wash the extract with aqueous sodium carbonate solution, water and saturated sodium chloride, then dry over anhydrous sodium sulfate. Filter and remove the solvent in vacuo to give 585 mg. of the crude title product, M.P. 100–110°. Further purify the sample by recrystallization from ether to give 400 mg. of the pure title product; M.P. 108–112°;

$\lambda_{max.}^{KBr}$ 3.0 and 6.03µ; $\lambda_{max.}^{EtOH}$ 243 mµ (ε 16,150)

Calcd. for $C_{19}H_{22}O_3$: C, 76.48; H, 7.43. Found: C, 76.48; H, 7.48.

EXAMPLE 26

(±)-17β-hydroxy-3-methoxy-13-methyl-14β-gona-1,3,5(10),8-tetraen-11-one

To a solution of sodium hydroxide (350 mg.) in methanol (25 ml.) add (±)-17β-hydroxy-3-methoxy-13-methylgona-1,3,5(10),8-tetraen-11-one (500 mg.) and stir the resulting solution at room temperature for 15 minutes. Add water (150 ml.) and extract the mixture with ethyl acetate. Wash the extract with water and saturated sodium chloride solution then dry over anhydrous sodium sulfate. Filter and evaporate in vacuo to an oil. Treat the oil with ether-petroleum ether to obtain 100 mg. of feathery needles of the title product; M.P. 108–112°.

EXAMPLE 27

(±)-3-methoxy-13-ethyl-14β-gona-1,3,5(10),8-tetraene-11,17-dione

Dissolve (±)-9,11-epoxy-8-hydroxy-3-methoxy-13-ethylgona-1,3,5(10)-trien-17-one (1.00 g.) in boiling methanol (30 ml.) and add 18% hydrochloric acid solution (10 ml.). Continue boiling for 1 hour then allow to cool. Filter the resulting slightly pink plates of title product (0.83 g.); M.P. 153–155°;

$\lambda_{max.}^{KBr}$ 5.79, 6.05 and 6.23µ; $\lambda_{max.}^{EtOH}$ 247 mµ (ε 16,500)

Calcd. for $C_{20}H_{22}O_3$: C, 77.39; H, 7.14. Found: C, 77.24; H, 7.08.

EXAMPLE 28

(±)-3-methoxy-13-ethyl-14β-gona-1,3,5(10),8-tetraene-11,17-dione

Dissolve (±)-3-methoxy-13-ethylgona-1,3,5(10),8-tetraene-11,17-dione (350 mg.) in boiling methanol (20 ml.) then add concentrated hydrochloric acid (1 ml.). Continue boiling for 20 minutes and let cool to room temperature to deposit 300 mg. of the title product; M.P. 152–155°.

EXAMPLE 29

(±)-17β-hydroxy-3-methoxy-13-ethyl-14β-gona-1,3,5(10),8-tetraen-11-one

Dissolve (±)-9,11-epoxy-3-methoxy-13-ethylgona-1,3,5(10)-trien-8,17β-diol (23.1 g.) in methanol (250 ml.). To the solution add 18% hydrochloric acid (100 ml.) dropwise while heating on the steam bath. After complete addition of the acid continue heating on the steam bath for an additional one-half hour. Cool the reaction, pour into water and extract into ether. Wash the extract with aqueous sodium carbonate, water and saturated sodium chloride solution then dry over anhydrous sodium sulfate. Filter and evaporate the solvents, cover the residue with ether and let stand to crystallize. Filter the off-white crystalline powder to get 11.6 g. of crude title product; M.P. 103–110°. Triturate the solid with ether and refilter to get 11.3 g.; M.P. 108–112°.

EXAMPLE 30

(±)-17β-hydroxy-3-methoxy-13-ethyl-14β-gona-1,3,5(10),8-tetraen-11-one

Dissolve (±)-17β-hydroxy-3-methoxy - 13 - ethylgona-1,3,5(10),8-tetraen-11-one (1.0 g.) in methanol (60 ml.) by boiling on the steam bath. To the hot solution add 18% hydrochloric acid (35 ml.) dropwise and continue heating for 20 minutes after complete addition of the acid. Cool, add water (250 ml.) and extract with ether. Wash the extract with aqueous sodium carbonate solution, water and with saturated sodium chloride solution then dry over anhydrous sodium sulfate. Filter and evaporate the solvent in vacuo to give 880 mg. of the crude title product as a white solid; M.P. 120–126°. Further purify the sample by recrystallization from ether to give 675 mg. of the pure title product; M.P. 120–123°;

$\lambda_{max.}^{KBr}$ 2.96 and 6.10μ; $\lambda_{max.}^{EtOH}$ 244 mμ ($\epsilon$ 16,000)

EXAMPLE 31

(±)-17,17-ethylenedioxy-3-methoxy-13-ethyl-14β-gona-1,3,5(10),8-tetraen-11-one

Dissolve (±)-3-methoxy-13-ethyl-14β-gona-1,3,5(10),8-tetraene-11,17-dione (0.50 g.), ethylene glycol (4.0 ml.) and p-toluenesulfonic acid (0.10 g.) in benzene (80 ml.) and reflux the solution into a water separator for 31 hours. Let cool to room temperature then pour the reaction into dilute potassium bicarbonate solution (250 ml.) and extract the mixture with ether. Wash the extract with water and with saturated sodium chloride solution then dry over anhydrous sodium sulfate. Filter and evaporate the solvents in vacuo to a yellow oil. Add ethanol and scratch to initiate crystallization. Filter to give 0.28 g. of the title product contaminated with a small amount of starting material; M.P. 109–120°;

$\lambda_{max.}^{KBr}$ 5.75 (trace) and 6.02μ

Further purify the product by dissolving it in hot ethanol, filtering through absorbent cotton and boiling to low volume. Let the solution cool and crystallize to give the pure title product (0.175 g.); M.P. 138–140°.

EXAMPLE 32

(±)-3-methoxy-13-ethyl-14β-gona-1,3,5(10),8-tetraene-11,17β-diol

Stir (±)-3-methoxy - 13 - ethyl-14β-gona-1,3,5(10),8-tetraene-11,17-dione (1.95 g.) with methanol (50 ml.). Add sodium borohydride (2.0 g.) in small portions to the stirred mixture over a period of 2 hours. After complete addition stir the solution for 1 more hour at room temperature. Dilute the reaction with water then filter and air-dry the precipitate. Dissolve the solid in methylene chloride, treat the solution with Nuchar charcoal and filter through Super Cel. Remove the methylene chloride in vacuo to a colorless oil. Dissolve the oil in a small amount of ether and seed the solution then allow to stand to complete crystallization. Filter the resulting white crystalline solid to give 1.11 g. of title product; M.P. 126–127°;

$\lambda_{max.}^{KBr}$ 3.0μ; $\lambda_{max.}^{EtOH}$ 273 mμ ($\epsilon$ 16,700)

The subject matter which the applicants regard as their invention is particularly pointed out and distinctly claimed as follows:

1. The compound according to claim 13, 9,11-epoxy-8-hydroxy - 3 - methoxy-13-methylgona-1,3,5(10)-trien-17-one.
2. The compound according to claim 13, 9,11-poxy-3-methoxy-13-methylgona-1,3,5(10)-triene-8,17-diol.
3. The compound according to claim 13, 9,11-epoxy-13-ethyl - 8 - hydroxy-3-methoxygona-1,3,5(10)-triene-17-one.
4. The compound according to claim 13, 9,11-epoxy-13-ethyl-3-methoxygona-1,3,5(10)-triene-8,17-diol.
5. The compound according to claim 16, 13-ethyl-3-methoxygona-1,3,5(10),8-tetraene-11,17-dione.
6. The compound according to claim 16, 13-ethyl-17-hydroxy-3-methoxygona-1,3,5(10),8-tetraen-11-one.
7. The compound according to claim 16, 13-ethyl-3-methoxygona-1,3,5(10),8-tetraene-11,17-diol.
8. The compound according to claim 19, 17β-hydroxy-3-methoxy-13-ethyl-14β-gona-1,3,5(10),8-tetraen-11-one.
9. The compound according to claim 19, 3-methoxy-13-ethyl-14β-gona-1,3,5(10),8-tetraene-11,17β-diol.
10. The process for preparing a 9,11-epoxy-13-alkyl-gona-1,3,5(10)-trien-8-ol, which comprises treating a 13-alkylgona-1,3,5(10),8-tetraene with an organic peracid.
11. The process for preparing a 13alkylgona-1,3,5(10)-trien-11-one which comprises reducing the 8(9)-double bond of a 13-alkylgona-1,3,5(10),8-tetraen-11-one with alkali metal and liquid ammonia.
12. The process for preparing a 13-alkyl-14β-gona-1,3,5(10),8-tetraen-11-one which comprises epimerizing a 13-alkylgona-1,3,5(10),8-tetraen-11-one with acid or base.
13. A compound having the structure

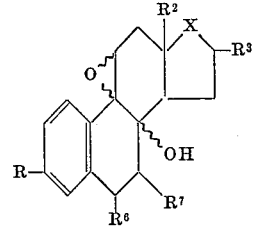

wherein
R is alkoxy, hydroxy or carboxylic acyloxy;
R² is alkyl;
R³ is hydrogen or hydroxy;
X is

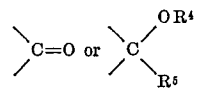

wherein
R⁴ is hydrogen or carboxylic acyl,
R⁵ is hydrogen, alkyl, alkenyl or alkynyl,
or R⁴ and R⁵ taken together are

and R⁶ and R⁷ are hydrogen or lower alkyl.

14. Compounds according to claim 13 wherein R is alkoxy and R² is methyl.
15. Compounds according to claim 13 wherein R is alkoxy and R² is ethyl.
16. A compound having the structure

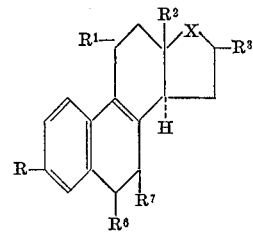

wherein
R is alkoxy, hydroxy or carboxylic acyloxy;
R¹ is oxo or hydroxy;
R² is polycarbon alkyl;
R³ is hydrogen or hydroxy;
X is

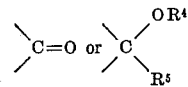

wherein
R⁴ is hydrogen or carboxylic acyl,
R⁵ is hydrogen, alkyl, alkenyl, or alkynyl,
or R⁴ and R⁵ taken together are

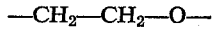

and R⁶ and R⁷ are hydrogen or lower alkyl.

17. Compounds according to claim 16 wherein R is alkoxy, R¹ is oxo and R² is ethyl.

18. Compounds according to claim 16 wherein R is alkoxy, R¹ is hydroxy and R² is ethyl.

19. A compound having the structure

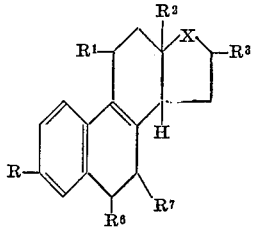

wherein
R is alkoxy, hydroxy or carboxylic acyloxy;
R¹ is oxo or hydroxy;
R² is polycarbon alkyl;
R³ is hydrogen or hydroxy;
X is

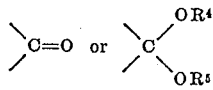

wherein
R⁴ is hydrogen or carboxylic acyl,
R⁵ is hydrogen, alkyl, alkenyl, or alkynyl,
or R⁴ and R⁵ taken together are

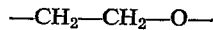

and R⁶ and R⁷ are hydrogen or lower alkyl.

20. The process for preparing a 13-alkylgona-1,3,5(10)-trien-11-one in which the 3-position bears no substituent which is ring-deactivating in electrophilic aromatic substitution and in which the hydrogen atom at position-14 may be attached in either epimeric configuration, comprising:

(a) treating a 13-alkylgona-1,3,5(10),8-tetraene or a 13-alkylgona-1,3,5(10),9(11)-tetraene-8-ol, wherein the 3-position bears no substituent which is ring-deactivating in electrophilic aromatic substitution, with an organic peracid to form the corresponding 9,11-epoxy-13-alkylgona-1,3,5(10)-trien-8-ol, (b) treating with acid to form a gona-1,3,5(10),8-tetraen-11-one, and (c) reducing the 8(9)-double bond with alkali metal in liquid ammonia.

21. The process for preparing a 13-alkylgona-1,3,5(10),8-tetraen-11-one, in which the hydrogen atom at position-14 may be attached in either epimeric configuration, which comprises treating with acid a 9,11-epoxy-13-alkylgona-1,3,5(10)-trien-8-ol wherein the 3-position bears no substituent which is ring-deactivating in electrophilic aromatic substitution.

22. The process according to claim 21 wherein the 9,11-epoxy-13-alkylgona-1,3,5(10)-trien-8-ol is treated with hydrochloric acid at a temperature below the boiling point of methanol to afford a 13-alkylgona-1,3,5(10),8-tetraen-11-one in which the hydrogen at position-14 is attached in the α-configuration.

23. The process according to claim 21 wherein the 9,11-epoxy-13-alkylgona-1,3,5(10)-trien-8-ol is treated with hydrochloric acid at above room temperature to afford a 13-alkylgona-1,3,5(10),8-tetraen-11-one in which the hydrogen at position-14 is attached in the β-configuration.

References Cited

UNITED STATES PATENTS 3,300,484   1/1967   Pappo _____ 260—239.5

OTHER REFERENCES

"Tetrahedron Letters," No. 41 (1966), pp. 5015–5020, by Stein et al.

ELBERT L. ROBERTS, Primary Examiner

U.S. Cl. X.R.
260—397.45, 397.5, 999